3,729,561
METHOD OF ANESTHETIZING AQUATIC
ANIMALS USING CERTAIN THIAZOLE
DERIVATIVES
Takahiko Kikuchi, Yokohama, and Motohiro Nishio,
Teiichiro Ito, and Yasuharu Sekizawa, Tokyo, Japan,
assignors to Meiji Seika Kaisha, Ltd., Tokyo, Japan
No Drawing. Filed Mar. 13, 1970, Ser. No. 19,459
Claims priority, application Japan, Mar. 20, 1969,
44/20,839, 44/20,840; May 14, 1969, 44/36,591; Dec.
9, 1969, 44/98,350, 44/98,351
Int. Cl. A01n 9/12
U.S. Cl. 424—270      16 Claims

ABSTRACT OF THE DISCLOSURE

Various aquatic animals such as fishes, shells etc., may be anesthetized to different degrees by treating water or marine water containing about 1 to 100 p.p.m. of known substituted 2-amino- or 2-methyl-thiazole derivatives of the general formula

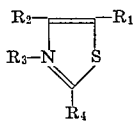

wherein $R_1$ is a hydrogen, methyl, ethyl, phenylmercapto or p-chlorophenylmercapto group; $R_2$ is methyl, ethyl, phenyl, p-methylphenyl, p-methoxyphenyl, p-chlorophenyl or p-bromophenyl group; or $R_1$ and $R_2$ taken together with the adjacent two carbon atoms of the thiazole nucleus form a tetrahydrobenzene ring, dihydronaphthalene ring or 4H-benzothiopyran ring fused to the thiazole nucleus when $R_4$ represents an amino group —$NH_2$; either $R_3$ is absent, or $R_3$ is a methyl group when $R_4$ represents a methylimino group =$NCH_3$ provided that the double bond adjacent to the nitrogen atom of the thiazole nucleus is then a single bond; and $R_4$ is a methyl, amino, hydrazine or methylimino group, as well as acid-addition salts thereof. Aquatic animals so anesthetized may have an improved resistance to long time transport thereof.

This invention relates to anesthesis of aquatic animals such as fishes, loach, crawfish, and shell, to transport of such anesthetized aquatic animals and particularly the present invention relates to a method of anesthetizing such aquatic animals by treating with one or more thiazole derivatives, and further to a composition for use in the anesthetizing treatment of aquatic animals which contains such a thiazole derivative as the active ingredient.

Recently it has been practised to temporarily anesthetize many fishes by treating with an effective amount of certain anesthetics and then to transport the anesthetized fishes while keeping them alive in a bath of water or marine water contained in any vessel or bag. When anesthetized, fishes may have an improved ability to resist to the transport for long time. Among the anesthetics which have been used for this purpose, ethyl m-aminobenzoate methanesulfonate is most frequently and widely used. However, the ethyl m-amino-benzoate methanesulfonate has suffered from such disadvantages that it is very much expensive and is likely to chemically decompose during its storage in aqueous solution and usage and hence can be inactivated soon. This expensiveness and chemical instability has restricted economic and extensive applications of this compound.

We have now found that a thiazole derivative of the general Formula I

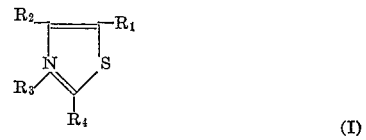

wherein $R_1$ is a hydrogen, methyl, ethyl, phenylmercapto or p-chlorophenylmercapto group; $R_2$ is methyl, ethyl, phenyl, p-methylphenyl, p-methoxyphenyl, p-chlorophenyl or p-bromophenyl group; or $R_1$ and $R_2$ taken together with the adjacent two carbon atoms of the thiazole nucleus form a tetrahydrobenzene ring, dihydronaphthalene ring or 4H-benzothiopyran ring fused to the thiazole nucleus as shown in the formula when $R_4$ represents an amino group —$NH_2$; either $R_3$ is absent, or $R_3$ is a methyl group when $R_4$ represents a methylimino group =$NCH_3$ provided that the double bond adjacent to the nitrogen atom of the thiazole nucleus as shown in the formula is then a single bond; and $R_4$ is a methyl, amino, hydrazine or methylimino group, as well as acid-addition salts thereof such as hydrobromide, hydrochloride, hemi-sulfate, hemi-malate, hemi-succinate and methane-sulfonate are very much effective to anesthetize temporarily a variety of aquatic animals such as fishes, either limnetic or marine, for example, carp, gold fish, killifish, trout, salmon, flat fish, loach and eel, including crawfishes, lobsters, crabs, and shells, and that such thiazole derivatives of the general Formula I are useful with advantage for use in the anesthetized transport of aquatic animals.

According to a first aspect of the present invention, therefore, there is provided a method of anesthetizing temporarily living aquatic animals, which comprises placing the aquatic animals in an anesthetizing bath consisting of water or marine water containing an effective concentration of at least one of the thiazole derivatives of the above-mentioned general Formula I as defined in the above and the acid-addition salts thereof as the anesthetic compound, for a sufficient time to anesthetize the animals.

According to a second aspect of the present invention, there is also provided a method of transporting living aquatic animals, while kept in the anesthetized state, which comprises placing the aquatic animals in an anesthetizing bath consisting of water or marine water containing an effective concentration of at least one of the thiazole derivatives of the general Formula I as defined in the above and the acid-addition salt thereof as the anesthetic compound, for a sufficient time to anesthetize the animals, and transporting the anesthetized animals while keeping them in said anesthetizing bath which is placed in a transporting container with blowing air or oxygen into the bath.

The aquatic animals which may be effectively anesthetized according to the methods of the present invention are of a wide variety. As examples of such aquatic animals may be mentioned the following:

Ostheichthyes

*Acanthopagrus schlegelii* (Bleeker) (Black snapper)
*Oplegnathus fasciatus* (Temminck et Schlegel) (Sea bream)
*Longirostrum delicatissimus* (Döderlein)
*Apogon semilineatus* (Temminck et Schlegel)
*Girella punctata* (Gray)
*Navodon modestus* (Günther)
*Pagrus major* (Temminck et Schleger)
*Goniistius zonatus* (Cuvier et Volenciennes)
*Paralichthys olivaceous* (Temminck et Schlegel) (flat fish)
*Stephanolepis cirrhifer* (Temminck et Schlegel)

*Seriola purpurascens* (Temminck et Schlegel)
*Oryzias latipes* (Temminck et Schlegel) (killifish)
*Cyprinus carpio* (Linne) (black carp)
*Carassius carassius* (Temminck et Schlegel) (crucian carp)
*Carassius carassius longsdorfii* (Temminck et Schlegel)
*Carassius carassius cuvieri* (Temminck et Schlegel)
*Carassius carassius* var. (gold fish)
*Salmo gairdnerii* (rainbow trout)
*Onchorhynchus* (salmon)
*Metynnis schreimulleri* (Ahl.)
*Misgurnus anquillicandatus* (Contor) (loach)

Gastropoda

*Nordotis gigantea* (Gmelin) (ear-shell)
*Batillus cornutus* (Solander) (wreath shell)
*Thais clavigera* (Küster)
*Sulculus divericor aquatillis* (Reeve)

Crustacea

*Procambarus clarkii* (Girard) (American crawfish)
*Palinurus japonica* (spring lobster)

Polyplacophora

Chiton-shell

In the following, however, the present invention will be described with reference to the anesthetizing treatment of fishes for sake of simplifying the explanation of the details of the invention.

In the methods of the present invention, the concentration of the anesthetic compound introduced in the anesthetizing bath which is used to treat the aquatic animals may vary in a wide range, depending on many factors involved, such as kind, body weight, number and age of fishes to be treated, nature of the active compound used, temperature in water, time require to keep fishes in the anesthetized state and others.

However, an optimum concentration of a particular anesthetic compound used may readily be determined by carrying out a simple preliminary test. We have found that a concentration of about 1 p.p.m. to about 100 p.p.m. of the thiazole compound of the general Formula I is usually effective to anesthetize various fishes within a reasonable time.

The thiazole derivatives of the general Formula I are advantageously less expensive to produce and much more chemically stable than the ethyl m-aminobenzoate methanesulfonate conventionally used for the same purposes. Some of the thiazole derivatives of the general Formula I exhibit a remarkable higher activity to anesthetize the fishes than the ethyl m-amino-benzoate methanesulfonate. In addition, when the fishes have been treated according to the present invention with an effective concentration of about 1 p.p.m. to 100 p.p.m. of one of the thiazole derivatives of the general Formula I and the acid-addition salts thereof, the fishes can rapidly be anesthetized substantially without developing the stage of excitation. As long as the fishes have been anesthetized in a reasonably short time according to the present invention, the anesthetized fishes do not suffer from such disordered conditions as muscle convulsions, respiratory trouble and circulatory disorder. Advantageously it is possible according to the methods of the present invention that the fishes are kept anesthetized for a period of up to 10 hours at more, where desired, without leaving any adverse side-effect in the fishes treated. The fishes which have been anesthetized according to the present invention do not make violent motion also in the course of recovery in which they are coming round from narcosis, so that there is no or little fear that the recovering fishes would injure their bodies through bumping against the container wall and/or through colliding with each other.

In carrying out the methods of the present invention, there is initially prepared the anesthetizing bath consisting of water or marine water containing a suitable, effective concentration of the anesthetic compound(s) by adding to water or marine water one or more of the thiazole derivatives of the general Formula I or a suitable formulation thereof such as solution, dispersion, suspension or solid mixture so that a suitable concentration of the active compound is given to the bath. If such a formulation as solution, dispersion, or solid mixture of the active compound is used, the formulation to be used may previously be prepared by mixing with an appropriate liquid of solid vehicle or carrier such as solvent, liquid diluent, solid carrier and the like as be described more particularly hereinafter.

The living fishes to be treated are then placed into the anesthetizing bath consisting of water containing the suitable effective concentration of the active compound(s). Volume of the bath, temperature in the bath and the number of fishes to be placed thereinto many be selected appropriately according to circumstances. Time required for the treated fishes to be anesthetized (this time is usually such a time elapsed between the point of introducing the fishes into the anesthetizing bath or of dosing the anesthetic compound into the water bath containing the fishes to be treated and the point at which the treated fishes have tumble down in the anesthetizing bath) is normally in a range of about 30 seconds to about 30 minutes, and sometimes it may amount to a longer period of e.g. up to 2–3 hours. Of course, the time required for the fishes to be anesthetized varies depending on the kind, body weight, age and number of the fishes to be treated as well as the nature and concentration of the particular anesthetic compound used. When the fishes are treated in accordance with the methods of the present invention, it is advantageously not observed that the treated fishes exhibit such stage of excitation that the treated fishes move violently either in the initial phase of the anesthetizing treatment of fishes or in the phase of recovering the anesthetized fishes.

According to the methods of the present invention, the treated fishes are kept in the anesthetized state by maintaining the fishes to reside in the anesthetizing bath. The time for which the treated fishes may be kept in the anesthetized state without giving adverse side-effect to the treated fishes may be varied in a range of about 1 minute to 10 hours or more by selecting any appropriate one from the thiazole derivative of the general Formula I and a suitable concentration thereof used in the anesthetizing bath according to the kind, body weight, age and number of the fishes to be treated. Furthermore, the treated fishes may be anesthetized to different extents by choosing any suitable one from the thiazole derivatives of the general Formula I and using a properly selected concentration thereof in the anesthetizing bath according to the kind, body weight, age and number of the fishes to be treated. With such fishes which have been anesthetized deeply in the anesthetizing bath by the methods of the present invention, the treated fishes have stopped their spontaneous swimming motions, tumbled down and finally do not show any reflexive motion even when they are pricked with a pin. With such fishes which have been anesthetized lightly in the anesthetizing bath according to the present invention, the treated fishes have stopped their spontaneous motion and maintained a resting or calming state without tumbling down and substantially without any reaction or without showing quick reaction to stimulus by sound or pin pricking, as long as they are kept to reside in the anesthetizing bath. In case of such lightly anesthetized fishes which have continued to show the calming state and hence have been sujected to the lightly anesthetizing or calming effect of the anesthetic compound in the anesthetizing bath according to the present invention, it has been found possible to maintain the treated fishes in the calming state for a period of 1 minute or more and, if required, even of up to 5–7 days by choosing suitably the nature and concentration of the anesthetic compound used in the anesthetizing bath. The fishes which have been lightly anesthetized to the calming state also have an improved resistance to a long time transport. With any particular compound of the thiazole derivatives of the general Formula I, it may be used either at such a concentration at which the treated fishes can be anesthetized deeply to an extent that they are forced to tumble down in the anesthetizing bath, or at such a concentration at which the fishes can be anesthetized lightly so as to keep merely the calming state in the anesthetizing bath. Optimum concentration of a particular compound of the thiazole derivatives which is used in the anesthetizing bath may be decided by carrying out a simple preliminary test in view of the kind, weight body, age and number of fishes to be treated and the degree to which the fishes are to be anesthetized, as well as the desired time necessary to keep the fishes in the anesthetized state.

The anesthetized fishes may be transported by a conventional transport device such as car while they are kept to reside in the anesthetizing bath placed in any transporting container vessel or bag of a suitable material such as plastics. Or alternatively, it is also possible to remove the anesthetized fishes from the anesthetizing bath and then transfer them into another transporting vessel or bag containing fresh water or marine water in which any anesthetic compound has not been incorporated. In the latter case, however, the anesthetized fishes relatively soon come round from narcosis, so that this procedure is not suitable for long-time transport. If the fishes are to be transported for a long time, therefore, we prefer it to transport the anesthetized fishes in such a way that they are kept to reside in the anesthetizing bath with blowing air or oxygen thereinto. In some cases, it is desirable or permissible that a further amount of fresh water or fresh marine water is added to the anesthetizing bath for the purpose of decreasing the concentration of the anesthetic compound therein.

When the anesthetized fishes are transferred into recovering bath consisting of a fresh water or marine water containing none of the anesthetic compounds in which may optionally be flown with air or oxygen, too. They are able to naturally recover soon the normal state. Time required for the anesthetized fishes to recover the normal state in this way is usually in a range of about 5 minutes to 60 minutes, and sometimes it takes several hours, and this required recovering time varies depending on the kind, body weight, age of the anesthetized fishes and the nature and concentration of the anesthetic compound used as well as the temperature in the recovering bath of water or marine water. The methods of the present invention are also advantageous in that the anesthetized fishes do not make violent motion in the course of recovery. When the fishes which had been recovered from the anesthetized state were raised in a pond in a usual way for a long period, for example, of several months, we have not observed that any disorder can occur in the appearance and behaviour of them.

As state hereinbefore, the anesthetizing bath which is used to carry out the methods of the present invention may be prepared also by adding a formulation containing one or more of the thiazole derivatives of the general Formula I. Such a formulation may be either in the form of solution, liquid dispersion and suspension or in the form of solid mixture. For the purpose of preparing these formulations, there may be used a suitable liquid and solid vehicle or carrier. As the liquid vehicle or carrier may be used any solvent or liquid which is water-miscible inert to the active compound and not toxic to fishes at the concentrations at which the vehicle will be present when the formulation is diluted with the water or marine water of the anesthetizing bath. As the solid vehicle or carrier may be employed any solid material which is water-miscible, inert to or compatible with the active compound and not toxic to the fishes at the concentrations at which the solid material is present dissolved in the water or marine water of the anesthetizing bath. For example, water, methanol, ethanol, dimethyl sulfoxide and the like are suitable as the liquid carrier, and polyvinyl pyrrolidone and sodium chloride are suitable as the solid carrier. If desired, it may be possible that any suitable surface-active agent such as non-ionic type surfactant, for example, "Sorpol 800B" (a registered trade name) is incorporated into such formulations for the purpose to aid the dissolution or dispersion of the active compound in the carrier material and/or to promote the dissolution of the active compound in water or marine water of the anesthetizing bath.

According to a third aspect or the present invention, therefore, there is provided an anesthetic composition for anesthetizing aquatic animals, which comprises as the active ingredient a thiazole derivative of the general Formula I as defined hereinbefore, and a liquid or solid carrier for the active ingredient.

In a preferred embodiment of the present invention, we prefer to use as the anesthetic compound a thiazole derivative of the following sub-general Formula II:

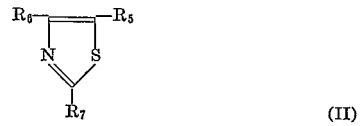

in which $R_5$ is a hydrogen, methyl or ethyl group; $R_6$ is a phenyl or methyl group; and $R_7$ is a methyl group or an amino group —$NH_2$, or the acid-addition salt thereof.

In a further preferred embodiment of the present invention, we prefer to use as the anesthetic compound a thiazole derivative of the Formula III:

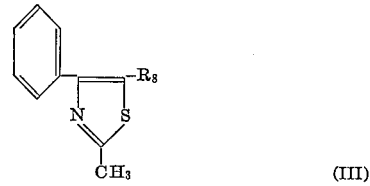

in which $R_8$ is a hydrogen or methyl group or the acid-addition salt thereof. As examples of the thiazole derivatives of the Formula III may be mentioned the following known compounds:

(1) 2-methyl-4-phenyl-thiazole of the formula

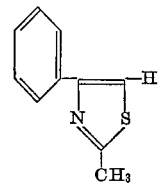

(2) 2,5-dimethyl-4-phenyl thiazole of the formula

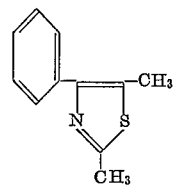

These two specific compounds (1) and (2) may be in the form of their acid-addition salts with one mol. of hydrobromic acid or hydrochloric acid or a half mol. of sulfuric acid, malic acid, succinic acid or methanesulfonic acid. These two specific compounds (1) and (2) as well as their acid-addition salts may effectively be used in the anesthetizing bath at a concentration of about third-fifth lower than the conventionally practised concentration of the ethyl m-amino-benzoate methanesulfonate which has been most frequently used as the anesthetics for fishes.

In a further embodiment of the present invention, there is used as the anesthetic compound a thiazole derivative of the Formula IV

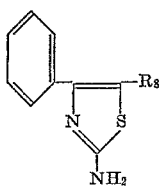

(IV)

in which $R_8$ is a hydrogen or methyl group, or the acid-addition salt thereof. As examples of the thiazole derivative of the Formula IV may be mentioned the following known compounds:

(3) 2-amino-4-phenyl-thiazole of the formula

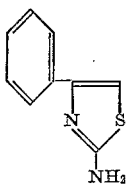

(4) 2-amino-4-phenyl-5-methyl-thiazole of the formula

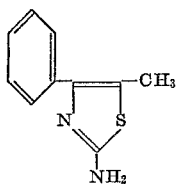

These two specific compounds (3) and (4) may also be in the form of the acid-addition salt with one mol. of hydrobromic acid or hydrochloric acid or a half mol. of sulfuric acid, malic acid, succinic acid and methane sulfonic acid.

These two compounds (3) and (4) as well as their hydrobromide, hydrochloride, hemi-sulfate, hemi-malate, hemi-succinate and methane sulfonate may effectively be used in the anesthetizing bath at concentrations of about ½ or less lower than the conventionally employed concentration of the known ethyl m-amino-benzoate methanesulfonate.

In another embodiment of the present invention, there is used as the anesthetic compound a thiazole derivative of the Formula V:

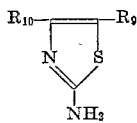

(V)

in which $R_9$ is a hydrogen or ethyl group; $R_{10}$ is a phenyl or p-methoxyphenyl group; or $R_9$ and $R_{10}$ together taken with the adjacent two carbon atoms of the thiazole nucleus form a tetrahydrobenzene ring, dihydronaphthalene ring or 4H-benzothiopyran ring fused to the thiazole nucleus as shown in the formula, or the acid-addition salt thereof. As examples of the thiazole derivative of the Formula V are mentioned the following known compounds:

(5) 2-amino-4-phenyl-5-ethyl-thiazole of the formula

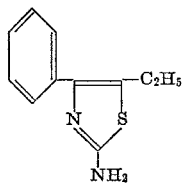

(6) 2-amino - 4 - (p-methoxyphenyl)-thiazole of the formula

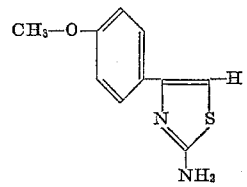

(7) 2-amino-tetrahydro-benzothiazole of the formula

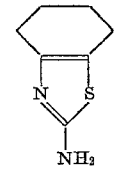

(8) 2 - amino - 4,5 - dihydronaphtho-(1,2)-thiazole of the formula

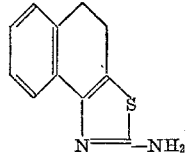

(9) 2-amino-4H-thiazole-(5,4-C)-benzothiopyran

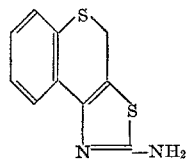

These specific compounds (5) to (9) may also be in the form of their acid-addition salts such as hydrobromide, hydrochloride, hemi-sulfate, hemi-malate, hemi-succinate and methane sulfonate.

In further another embodiment of the present invention, there is used as the anesthetic compound a thiazole derivative of the Formula VI:

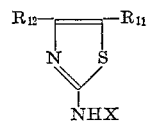

(VI)

in which $R_{11}$ is a hydrogen, methyl or phenyl mercapto group; $R_{12}$ is an ethyl, phenyl, p-methylphenyl or p-chlorophenyl group; and X is a hydrogen or an amino group —$NH_2$, or the acid-addition salt thereof. As examples of the thiazole derivative of the Formula VI are the following known compounds:

(10) 2-hydrazino-4-phenyl-thiazole of the formula

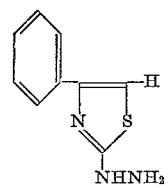

(11) 2-amino - 4 - (p-methylphenyl)-thiazole of the formula

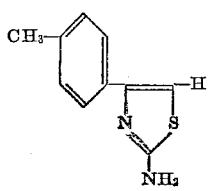

(12) 2-amino-4-(p-chlorophenyl)-thiazole of the formula

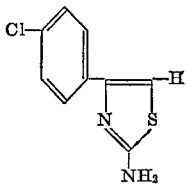

(13) 2 - amino - 4 - ethyl - 5 - methyl-thiazole of the formula

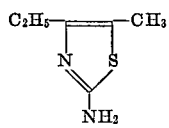

(14) 2-amino-4-phenyl - 5 - phenylmercapto-thiazole of the formula

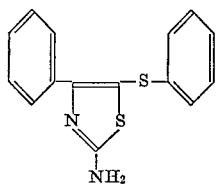

These specific compounds (10) to (14) may also be used in the form of their acid-addition salts such as hydrobromide, hydrochloride, hemi-sulfate, hemi-malate, hemi-succinate and methane-sulfonate.

In the other embodiment of the present invention, there is used as the anesthetic compound a thiazole derivative of the Formula VIII:

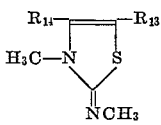

in which $R_{13}$ is a hydrogen or p-chlorophenylmercapto group; and $R_{14}$ is a phenyl or p-bromophenyl group, or the acid-addition salt thereof. As examples of the thiazole derivative of the Formula VII are the following known compounds:

(15) 2-methylimino - 3 - methyl-4-(p-bromophenyl)-thiazole of the formula

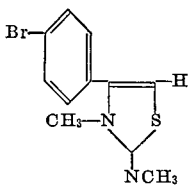

(16) 2-methylimino-3-methyl - 4 - phenyl-5-(p-chlorophenylmercapto)-thiazole of the formula

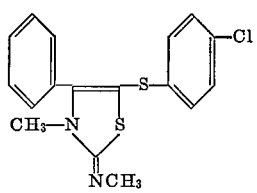

These specific compounds (15) and (16) may also be used in the form of their acid-addition salts such as hydrobromide, hydrochloride and hemi-sulfate.

As further specific compounds which may be used in the methods of the present invention are mentioned the following known compounds:

(17) 2-methyl-4-phenyl - 5 - ethyl-thiazole of the formula

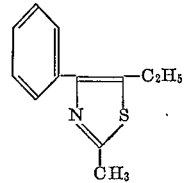

(18) 2,4-dimethyl-thiazole of the formula

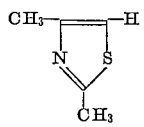

It may be seen that these two specific compounds (17) and (18) are covered by the sub-general Formula II as shown above. The acid-addition salts of the above-mentioned specific compounds are comparable in their anesthetic activity to the corresponding free bases but are advantageously improved in their solubility in water.

The thiazole derivative of the general Formula I which may be used as the anesthetic compound according to the methods of the present invention is normally present at a very much low concentration of about 1 p.p.m. to 100 p.p.m. in the anesthetizing bath.

We checked whether any residual amount of the thiazole derivatives of the general Formula I was found in any portion of the body of fish which had been anesthetized by the methods of the present invention. Thus, one-year-old black carp was anesthetized by keeping in an anesthetizing water bath containing 10 microcurie grams/ml. of radio-activated 2-amino-4-phenyl-thiazole at 22° C. for 24 hours under aeration, then removed from the anesthetizing bath and transferred into a recovering bath of 50 l. of clear water. The fish was raised for a period of the subsequent 3 months in a usual way while about 15 l. of the water in the bath was replaced by another 15 l. of fresh water every other day. The fish was then dissected and various organs thereof such as skin, muscle, brain, heart, liver and entera were isolated, separately homogenized and extracted with methanol for 3 days. The methanolic extracts were concentrated at low temperature and the concentrates were then examined by means of a liquid scintillator counter, but it was not then observed that the resulting concentrates showed any significant radio-activity, as we believe that in the methods of the present invention a very much minor but effective proportion of the anesthetic compound present should be administered from the anesthetizing bath to the treated fishes mainly orally and/or through the branchial organs and then plays the anesthetizing action on the nerve of fishes. Accordingly, it is clear that the fishes which have been anesthetized by the methods of the present invention and then recovered contains no or negligible amount of the thiazole derivative used in the flesh portion of the fish body. It is sure that any toxic amount of the thiazole derivative used is not given to men, if any fishes which are edible and which were anesthetised according to the methods of the present invention are then recovered in a recovering bath of clear water, cooked and eaten by men. To further demonstrate the safety, it may be added that the toxicity of the thiazole derivative of the general Formula I themselves is low or relatively low, as will be seen from the $LD_{50}$ values (for mice) which are mentioned below for some of the concerned thiazole derivatives.

| Compound: | $LD_{50}$, Mg./kg. |
|---|---|
| 2-amino-4-phenyl-thiazole hydrobromide | 200 |
| 2-methyl-4-phenyl-thiazole hydrobromide | 650 |
| 2-methyl-4-phenyl-5-ethyl-thiazole hydrobromide | 400 |
| 2-amino-tetrahydro-benzothiazole | more than 1000 |

These $LD_{50}$ values were determined by orally administering a solution of 1% of the test compound dissolved in an aqueous 5% solution of arabian gum to ICR strain mice (body weight 20 ± 0.5 g.) (10 mice for each test compound) according to the Behrens-Kaerlar method.

In the above, the invention has been described exclusively with reference to the anesthetizing treatment of fishes, but it is to be understood that the present invention is equally applicable to the anesthetizing treatment of other aquatic animals, such as crawfishes, lobsters, crabs, loaches, eels and shells etc.

The invention is now illustrated by the following examples but to which the present invention is not limited in any way.

EXAMPLE 1

Anesthetic compounds of the structural formulae as indicated below in Table 1 were each dissolved in methanol to give different methanolic solutions each containing 50 mg./0.5 ml. of the active compound. In glass pots of 15 cm. in diameter and 15 cm. in height was each placed 1 litre of water, and the methanolic solution was then added dropwise to the water in each pot under agitation to give such concentrations of the active compounds as indicated below in Table 1. Five young black carps (*Cyprinus carpio*) of about 8 cm. in body length were placed into the aqueous anesthetizing bath so prepared in each pot. Time for the fishes to be anesthetized, that is, the required anesthetizing time (this time was a time elapsed between the point of introducing the fishes into the anesthetizing bath or of administering the test compound in the water bath and the point at which the treated fishes had tumbled down in the anesthetizing bath due to being anesthetized) was determined. The anesthetized fishes were kept to reside in the anesthetizing bath for a varying resident time as specified in Table 1 below. Thereafter the anesthetized fishes were removed from the anesthetizing bath and then transferred into a recovering bath of clear water containing no anesthetic compound, so that the fishes might be recovered from the anesthetized state to the normal condition and could show a quick reaction to a stimulus with a pin pricking or sound. Time required for the fishes to recover the normal state, that is, the required recovering time (this time was a time elapsed between the point of introducing the anesthetized fishes into the recovering bath and the point at when the anesthetized fishes which tumbled down had turned up again to the normal position) was also determined. The test results obtained are shown in Table 1 in which the figures are the average of the required anesthetizing or recovering time determined for each fish. After the recovery, the fishes used in the tests were raised in a pond in a normal way over the subsequent period of 3 months, but we could not observe that any disorder occurred in these treated fishes, as compared to the control group of fishes which remained untreated.

TABLE 1

| Test Compound of the formula | Concentration of active compound (p.p.m.) | Required anesthetizing time (minute) | Resident time in anesthetizing bath (minute) | Required recovering time (minute) |
| --- | --- | --- | --- | --- |
| 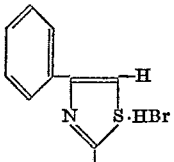 | 50 | 4 | 50 | 20 |
| 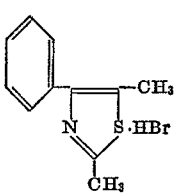 | 50 | 4 | 10 | 30 |
|  | 25 | 6 | 30 | 25 |

EXAMPLE 2

Test of anesthetizing fish for long time was carried out using 2-methyl-4-phenyl-thiazole hydrobromide. In cylindrical glass pots of 15 cm. in height and 15 cm. in diameter was each placed 1 litre of water. Into two of the pots was each introduced 40 mg. of the test compound, so that the anesthetizing bath comprised an aqueous solution of 40 p.p.m. of the active compound. In one of the pots was not added the test compound, so that the water bath was left untreated. Consequently, three pots, in total, were ready for the test. Fifteen young black carps of 8–10 cm. in body length were placed in each pot, and the test was carried out while blowing air into the aqueous anesthetizing bath for the purpose of compensating the deficiency of oxygen. During the test, the water temperature in the bath was maintained at 22° ± 1° C.

Time required for the fishes to be anesthetized was determined at first. The anesthetized fishes were left to reside in the anesthetizing bath for the subsequent period of 20 minutes, and then 500 ml. of water was added to the anesthetizing bath for dilution so that the concentration of the test compound was reduced to 26.7 p.p.m. 30 minutes later, 100 ml. of water was further added to the anesthetizing bath so that the concentration of the test compound was 25 p.p.m. in the diluted anesthetizing bath. With the control group of fishes untreated, the dilution of the bath with water was also effected in the same way. The fishes were kept to reside in the aerated, diluted anesthetizing bath for 3 hours while the bath-containing pots were placed on a driving car, and then the fishes were removed out of the bath and transferred into a recovering bath of clear water. Observation and determination were made with respect to the required recovering time, side-effects, pH, content of the remaining oxygen dissolved in the anesthetizing bath, turbidity in water and other conditions. The test results obtained are shown in Table 2. It was found that the fishes exhibited no disorder and that this test compound is very much useful to anesthetize the fishes for a long time transport.

TABLE 2

| Test group | Required anesthetizing time (minute) | Required recovering time (minute) | pH | Content of remaining dissolved oxygen (mg./l.) | Observations |
|---|---|---|---|---|---|
| Group treated with [structure: 4-phenyl-2-methyl thiazole · HBr] | 5 | 30 | 7.2 | 2.7 | Fishes stopped the motion, the reaction to vibration was very much weak. No reaction was observed particularly when vibration continued. Excrement from fishes was little. Water showed little turbidity. No adverse effect was noticeable. |
| Untreated group | | | 7.4 | 0.6 | Fishes made violent motions and discharged much excrement. Water became very much turbid. |

EXAMPLE 3

The anesthetic effect on a variety of fishes was examined using the same compound as employed in Example 2. The test procedure and estimation of the test results were made in the same way as in Example 1. The results are shown in Table 3, and it was found that the tested compound was effective for anesthetizing various fishes.

TABLE 3

| Test fish | Required anesthetizing time (minute) | Resident time in anesthetizing bath (minute) | Required recovering time (minute) |
|---|---|---|---|
| Red killifish | 6 | 5 | 15 |
| Killifish | 6 | 5 | 7 |
| Loach | 2 | 5 | 15 |

EXAMPLE 4

Compounds of the formulae as indicated below in Table 4 were each dissolved in a 20-fold volume of dimethyl sulfoxide, and to the resulting solution was added "Sorpol 800 A and B" (a registered trade name; "Sorpol" is a formulation of an non-ionic surface active agent as produced Toho Chemical Industry Co. Ltd., Tokyo, in such a proportion that the ratio by weight of "Sorpol 800 A and B" to the above-mentioned anesthetic compound was 1:1 in the resulting emulsifiable solution). As the test fish were used young black carps of about 8 cm. in body length on average. In glass pots of 15 cm. in diameter and 15 cm. in height was each placed 1 litre of water, and the emulsifiable solution of the test compound was added dropwise to the water bath in each pot under agitation, so that the test compound present in the water bath showed various concentrations as specified in Table 4 below. Five fishes to be tested were then placed into the anesthetizing bath in each pot, and the time required for the fishes to anesthetize as well as the resident time of the fishes in the anesthetizing bath were recorded. Thereafter, the anesthetized fishes were removed from the anesthetizing bath and transferred into a recovering bath of clear water to determine the required recovering time which was necessary for the fishes to come round from the anesthetized condition. In all the tests, the water temperature in the bath was maintained at 22° C., and the required anesthetizing and recovering times determined in each test were converted into the average value thereof. The results are shown in Table 4 below. The fishes were raised in a pond in a usual way for 3 months subsequent to the recovery, but we could not then observe that any disorder occurred and any difference in the increase of body weight was brought about in the treated fishes, as compared to the control group of fishes untreated.

TABLE 4

| Test compound of formula | Concentration of test compound (p.p.m.) | Required anesthetizing time Minutes Seconds | | Resident time in anesthetizing bath, minutes | Required recovering time Minutes Seconds | |
|---|---|---|---|---|---|---|
| [2-amino-4-phenyl thiazole] | 25 | 3 | | 5 | 13 | 40 |
| | 10 | | | 10 | 13 | 30 |
| | 20 | | | 20 | 31 | 30 |
| [2-amino-4-phenyl thiazole · HBr] | 25 | 6 | | 40 | 22 | |
| | | | | 50 | 30 | 30 |
| | | | | 90 | 30 | 30 |
| [2-amino-4-phenyl-5-methyl thiazole] | 25 | 3 | 50 | 5 | 22 | 30 |
| | | | | 10 | 20 | |
| | 12.5 | 3 | | 10 | 19 | |
| | | | | 20 | 28 | |
| | | | | 40 | 84 | |

TABLE 4—Continued

| Test compound of formula | Concentration of test compound (p.p.m.) | Required anesthetizing time Minutes | Required anesthetizing time Seconds | Resident time in anesthetizing bath, minutes | Required recovering time Minutes | Required recovering time Seconds |
|---|---|---|---|---|---|---|
| 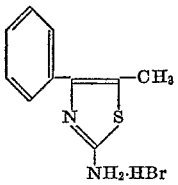 | 50 | | 45 | 3 | 16 | |
| | | | | 4 | 19 | |
| | 25 | 2 | 15 | 3 | 13 | |
| | | | | 5 | 23 | 15 |
| | 12.5 | 6 | | 3 | 15 | |
| | | | | 10 | 11 | 30 |
| | | | | 20 | 29 | |
| Ethyl m-aminobenzoate methanesulfonate (comparative). | 50 | 5 | 40 | 10 | 4 | 40 |
| | | | | 20 | 5 | |
| | 25 | (1) | (1) | | | |

[1] Not able to anesthetize.

EXAMPLE 5

To 1 part of 2-amino-4-phenyl-thiazole hydrobromide were added 3 parts of polyvinyl pyrrolidone, and to the mixture was added its 50-fold volume of dioxane. The admixture was then freeze-dried and introduced into the anesthetizing bath in an amount just sufficient to give a concentration of 25 p.p.m. of the active compound therein. The test fishes and test procedure were same as those employed in Example 4. The results obtained are shown in Table 5 below.

TABLE 5

| Test compound | Required anesthetizing time, minutes | Resident time in anesthetizing bath, minutes | Required recovering time Minutes | Required recovering time Seconds |
|---|---|---|---|---|
| 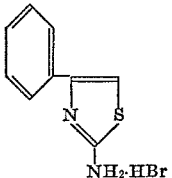 | 6 | 40 | 16 | |
| | | 50 | 11 | |
| | | 60 | 19 | |
| | | 90 | 17 | 30 |

EXAMPLE 6

The anesthetic effect on a variety of fishes and American crawfish was tested using the same compound as employed in Example 5. The test procedure and formulation of the test compound used were same as those in Example 4. Test aquatic organisms were of 4 kinds, that is, "Metynnis schreimulleri" of about 13 cm. in body length; killifishes of 2 cm. in length; red killifishes of about 1.5 cm. in length and American crawfishes of about 4 cm. in length. The results obtained are shown in Table 6 below.

TABLE 6

| Species | Concentration of test compound (p.p.m.) | Required anesthetizing time Seconds | Required anesthetizing time Minutes | Required anesthetizing time Hours | Resident time in anesthetizing bath Minutes | Resident time in anesthetizing bath Hours | Required recovering time Minutes | Required recovering time Hours |
|---|---|---|---|---|---|---|---|---|
| Metynnis schreimulleri | 80 | 30 | | | 1 | | 17 | |
| American crawfish | 80 | | | 3 | | 7 | | <14 |
| Red killifish | 25 | | 5 | | 1 | | 5 | |
| Killifish | 40 | | 3 | | 5 | | 19 | |

EXAMPLE 7

Compounds as indicated in Table 7 were each dissolved in its 20-fold amount (by weight) of dimethyl sulfoxide, and to the resulting solution was added a surface active agent sold under a registered trade name "Sorpol 800B" in such a proportion that the ratio by weight of the surface-active agent to the test compound was 1:1 in the emulsifiable solution so prepared.

Young black carp of about 8 cm. in body length were used as the test fish. In glass pots of 15 cm. in diameter and 15 cm. in height was each placed 1 litre of water, and the above-mentioned emulsifiable solution was dropwise added to water in each pot under agitation so that the active compound present in the resultant anesthetizing bath showed various concentrations as specified in Table 7 below. Five test fishes were then placed into the anesthetizing bath in each pot, and the time necessary to anesthetize the fishes as well as the subsequent resident time of the fishes in the anesthetizing bath were recorded. The anesethetized fishes were then removed from the anesthetizing bath and transferred into a recovering bath of clear water to determine the recovering time which was required for the fishes to turn up their position.

In all the tests, the water temperature in the bath was kept at 22° C., and the required anesthetizing and recovering times determined in each test were converted into the average values. The results obtained are shown in Table 7. After the recovery, the fishes were raised in a pond in a usual way for 3 months, but we could not then observe that any disorder occurred and any difference in the increase of body weight appeared in the treated fishes, as compared to the control group of fishes untreated. In addition to the free base compounds which are shown in Table 7, the hydrochloride, hemi-sulfate, hemi-malate and hemi-succinate of the free bases were also tested in the same way, and it was found that these acid-addition salts gave the values of the anesthetic activity which were only different from those of the free bases within the errors of determination.

TABLE 7

| Test compound of the structural formula | Concentration of test compound (p.p.m.) | Required anesthetizing time, minutes | Resident time in anesthetizing bath, minutes | Required to recovering time, minutes |
|---|---|---|---|---|
| Phenyl-thiazoline with −H substituent, −NH$_2$, ·Z where Z is either absent or represents HCl, ½ H$_2$SO$_4$, ½ C$_4$H$_6$O$_5$ or ½ C$_4$H$_6$O$_4$ | 25 | 3–7 | 10 | 10–15 |
| Phenyl-thiazoline with −CH$_3$ substituent, −NH$_2$, ·Z where Z is either absent or represents HCl, ½ H$_2$SO$_4$, ½ C$_4$H$_6$O$_5$ or ½ C$_4$H$_6$O$_4$ | 25 | 1–3 | 10 | 20–30 |
| Phenyl-thiazoline with −H substituent, −CH$_3$, ·Z where Z is either absent or represents HCl, ½ H$_2$SO$_4$, ½ C$_4$H$_6$O$_5$ or ½ C$_4$H$_6$O$_4$ | 50 | 4–6 | 50 | 15–30 |
| Phenyl-thiazoline with −CH$_3$ substituent, −CH$_3$, ·Z where Z is either absent or represents HCl, ½ H$_2$SO$_4$, ½ C$_4$H$_6$O$_5$ or ½ C$_4$H$_6$O$_4$ | 50 | 3–6 | 30 | 25–30 |

EXAMPLE 8

Compounds of structural formulae as shown in Table 8 were each dissolved in methanol to prepare various methanolic solutions each containing 50 mg./ml. of the active compounds. To each of the resulting solutions was added a methanolic solution of 100 mg./ml. of a surface-active agent "Sorpol 800A and B" at a ratio of 1:1 by volume to prepare the emulsifiable solutions. In glass pots of 15 cm. in diameter and of 15 cm. in height was each placed 1 litre of water, and the emulsifiable solution prepared was added dropwise to the water in each pot under agitation to give various concentrations of the active compounds as specified below in the resultant anesthetizing bath. Five one-year-old black carp of about 10 cm. in body length were placed into the anesthetizing bath in each pot, and subsequently the presence or absence of the anesthesizing activity of the tested compounds were checked. Thus, the time required to anesthetize the fishes was estimated and the subsequent resident time of the fishes in the anesthetizing bath was recorded. The anesthetized fishes were then removed from said bath and transferred into a recovering bath of clear water, and then the recovering time required for the fishes to come round from the anesthetized state was estimated. The tests were carried out at a water temperature of 22° C. in the bath. The test results are shown in Table 8 below. The fishes which were used in this series of tests were raised in a pond in a usual way for 3 months after the recovery, but it could not then be found that any disorder occurred in these treated fishes, as compared to the control group of fishes untreated.

In this series of tests, there was a case when the anesthetizing bath used showed merely the calming effect on the treated fishes, that is to say, the treated fishes were lightly anesthetized only to such an extent that they had stopped their spontaneous motion but yet did not tumble down in the anesthetizing bath and maintained therein the calming state substantially without showing any quick reaction to stimulus by sound or to a pin pricking. With these lightly anesthetized fishes, it was found possible to maintain the treated fishes in the calming state for a period of 1 minute or more and, if required, even up to 5–7 days by keeping them in the anesthetizing bath in accordance with the methods of the present invention. In the case of the lightly anesthetized fishes which maintained the calming state in this series of tests, the required anesthetizing time was determined as such a time elapsed between the point of introducing the fishes into the anesthetizing bath or of dosing the test anesthetic compound in the water bath containing the fishes to be treated and the point at which the treated fishes had stopped their spontaneous motion in the anesthetizing bath; and the required recovering time was assumed as such a time elapsed between the point of introducing the anesthetized fishes into the recovering bath and a point at which the fishes begun to react quickly to sound stimulus or a pin pricking. Even with a particular compound of the thiazole derivatives of the general Formula I which is capable of anesthetizing pare various methanolic solutions each containing 50 mg./0.5 ml. of the active compounds. To each of these solutions was added a methanolic solution containing 100 mg./0.5 ml. of a surface-active agent "Sorpol 800A and B" at a ratio of 1:1 by volume to prepare emulsifiable solutions of the test compounds. In glass pots of 15 cm.

TABLE 8

| Test compound of formula | Concentration of test compound (p.p.m.) | Stage of excitation | Required anesthetizing time, minutes | Resident time in anesthetizing bath, minutes | Required recovering time, minutes | Observations |
|---|---|---|---|---|---|---|
| 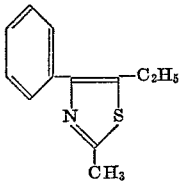 | 25 | Not observed | 14 | 10 | 10 | Good anesthetizing effect. |
| 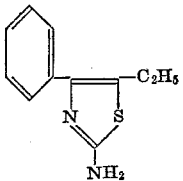 | 50 | ___do___ | 1 | 8 | 30 | Not excellent anesthetic, as reflexive motion remained but good calming effect observed. |
| 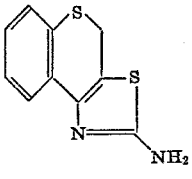 | 25 | ___do___ | 3 | 6 | 18 | Weak reflexive motion remained to an extent after tumbling down. |
| 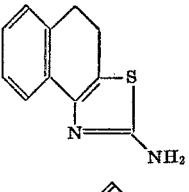 | 25 | ___do___ | 8 | 1 | 45 | Weak reflexive motion remained even after tumbling down. |
| 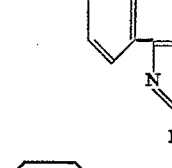 | 25 | ___do___ | 4 | 5<br>10<br>20 | 14<br>14<br>32 | No convulsion observed during anesthesis but slight convulsion during recovery. |
| 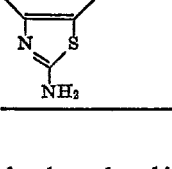 | 50 | ___do___ | 10 | 30 | 14 | Weak muscle convulsion observed during anesthetizing but useful for long time anesthetized transport. | deeply and making the fishes tumbled down at a certain concentration of the active compound in the anesthetizing bath, it showed merely the calming effect on the fishes when it was used at a concentration well below the abovementioned concentration at which it could anesthetize the treated fishes deeply to tumble down.

In a similar way to Example 8, the anesthetizing or calming effect was tested on American crawfishes, it was found that all the compounds having the structural formulae as shown in Table 8 were effective for the purpose of the present invention.

EXAMPLE 9

Compounds of such structural formulae as shown in Table 9 below were each dissolved in methanol to pre-
in diameter and of 15 cm. in height was each introduced 1 litre of water, and the emulsifiable solution prepared in the above was then added dropwise to the water in each pot under agitation to give the specified concentration of the test compound as indicated in Table 9 below. Five one-year-old black carp of about 10 cm. in body length were then placed in the anesthetizing bath in each pot, and the presence or absence of the stage of excitation and the calming effect were examined. The anesthetized fishes were subsequently removed from the bath and transferred into a bath of clear water, and the time required for the fishes to recover was recorded. These tests were carried out at a water temperature of 22° C. in the bath. The fishes which had been used in this series of tests were again raised in a pond in a usual way for 3 months after the recovery, and it was not found that any disorder developed in these treated fishes, as compared to the control group of fishes untreated.

other pot was not added with said solution and hence was left untreated. Thus, three pots were ready for the tests. Ten black carp of approximately 10 cm. in body length

TABLE 9

| Test compound of formula | Concentration of test compound (p.p.m.) | Stage of excitation | Observations |
|---|---|---|---|
| 2-hydrazino-4-phenylthiazole (4-phenyl-2-NHNH$_2$-thiazole) | 25 | Not observed | Fishes showed reduced sensation to vibrations but somewhat strongly reacted to pin pricking. Calming effect lasted for long time. |
| 4-(4-bromophenyl)-3-methyl-2-methylimino-thiazoline | 25 | do | Weak anesthetizing effect observed, which was rather the calming effect. |
| 2-amino-4-(4-methylphenyl)thiazole | 25 | do | Fishes reacted to pin pricking still after tumbling down. |
| 2-amino-4-(4-chlorophenyl)thiazole | 25 | do | Fishes' motions became dull already in 1 minute after the dosage. |
| 2-amino-4-ethyl-5-methylthiazole | 50 | do | Good calming effect observed. |
| 2,4-dimethylthiazole | 50 | do | Reaction to stimulus was reduced in 10 minutes after the administration. |
| 4-phenyl-5-(4-chlorophenylthio)-3-methyl-2-methylimino-thiazoline | 25 | do | Reaction to stimulus was reduced in about 10 minutes after the administration. |
| 2-amino-4-phenyl-5-phenylthio-thiazole | 25 | do | Reaction to stimulus was reduced slowly and naturally. |

EXAMPLE 10

Tests were carried out to observe the long-lasting calming effect of 2,4-dimethyl-thiazole hydrobromide. In cylindrical glass pots of 15 cm. in diameter and 15 cm. in height was each introduced 1 litre of water, and a solution of 50 mg. of the test compound in 0.5 ml. of methanol was introduced into the water in two pots. The was placed into the bath in each pot. The tests were then effected while air was passed through the bath to supplement the lack of oxygen. During the tests, the water temperature in the bath was kept at 22°±1° C.

As result, it was found that the fishes stopped their motions about 10 minutes after they had been placed in the anesthetizing bath, that the reactions to vibration and pin pricking became very dull since and that the fishes retained the similar conditions for three hours later. No muscle convulsion was observed. 3 hours after the administration, the fishes were removed from the anesthetizing bath and then transferred into a recovering bath of clear water. The fishes had recovered to the normal state in 3 hours. When the fishes were subsequently kept in a pond in a usual way for 3 months, no disorder was then observed.

EXAMPLE 11

To 1 part of 2-amino-4-phenyl-5-phenylmercaptothiazole was added 9 parts of sodium chloride, and these were mixed and triturated thoroughly in a glass mortar. 500 mg. of the resulting mixture was added to 1 litre of water (corresponding to a concentration of 50 p.p.m. of the test compound) with well agitation. When the test compound was uniformly dispersed in the water, two young black carp were placed thereinto. It was noted that the satisfactory calming effect was obtained. Thus, the treated fishes stopped their motions and reacted dully to stimulus with sounds, light and pin pricking, as compared to the control group of fishes untreated. With a continuous stimulus, the treated fishes showed a reaction only to the initial spur of stimulus.

EXAMPLE 12

Rainbow trout (*Salmo gairdnerii*) of 6.8–7.5 cm. in body length and of 6.25–8.95 g. in body weight were placed in 500 ml. of an anesthetizing bath consisting of an aqueous solution of 30 p.p.m. of 2-amino-4-phenyl-thiazole. One minute 30 seconds after the introduction of the fishes into the anesthetizing bath, the fishes tumbled down due to the anesthesia, and then the anesthetized fishes were kept to reside in the anesthetizing bath for 1 minute. The fishes were then transferred into a recovering bath of clear water. After the transfer into the recovering bath, it was observed that the fishes took bait, so that the fishes might be found to have recovered completely. In the subsequent period of 2 months, the fishes were raised in a pond in a usual way while their body length and weight were determined weekly. It was not found that any difference occurred between the fishes treated by the method of the present invention and the control group of fishes untreated.

EXAMPLE 13

Different kinds of marine fishes were collected from the sea near our laboratory and then raised for a few days in a usual way in a pond containing marine water which was formed in our laboratory.

In a 15 l. bucket made of polyvinyl chloride was placed 10 l. of marine water into which air was blown and then a varying number of the test fishes were introduced. A solution in methanol of 10% of 2-amino-4-phenyl-thiazole as the test compound was added dropwise and under stirring to the water in the bucket to a concentration of the test compound as indicated in Table 10 below. After the administration of the test compound, the fishes were observed for the presence of the stage of excitation (that is, whether the fishes treated made violent motions or not). The required anesthetizing time was determined, and the anesthetized fishes were kept to reside in the anesthetizing bath for a varying period as indicated in Table 10 below. This varying period was recorded in Table 10 as "Resident time." Thereafter, the anesthetized fishes were transferred into a recovering bath of clear water containing no anesthetic compound, and the time was determined which was required for the fishes to recover the normal state that the fishes could show a quick reaction to stimulus with pin pricking or sound. This time was recorded in Table 10 as "Required recovering time." The fishes were observed also for the presence of excitation stage while they were placed in the recovering bath. During the tests, the water temperature in the bath was kept at 20–22° C. The required anesthetizing and recovering times determined were converted into the average figures, which are shown in Table 10 below.

TABLE 10

| Species | Body length (cm.) | Body weight (grams) | Number of fishes tested | Concentration of test compound in anesthetizing bath (p.p.m.) | Required anesthetizing time (minute) | Resident time (minutes) | Required recovering time (minute) | Remarks |
|---|---|---|---|---|---|---|---|---|
| *Apogon semilineatus* | 9.5 | 28.5 | 5 | 100 | 4 | 3 | 20 | |
| *Girella punctata* | 1.5 | 0.3 | 10 | 10 | 180 | 120 | 5–10 | |
| | 1.5 | 0.3 | 10 | 5 | | [1]24 | 5–10 | Lightly anesthetized; calming effect. |
| | 3.4 | 0.7 | 10 | 20 | 10 | 0 | 4 | Water temperature was at 130° C. in anesthetizing bath but at 22° C. in recovering bath. |
| | 3.4 | 0.7 | 10 | 20 | 5 | 0 | 4 | Water temperature was at 22° C. both in the anesthetizing and recovering baths. |
| *Stephanolepis cirrhifer.* | | 65 | 1 | 20 | 6 | 7 | 20 | |
| *Pagrus major* | | 185 | 5 | 20 | 15 | 20 | 15 | |
| | 21 | 195 | 1 | 5 | | [1]3 | 5 | Lightly anesthetized; calming effect. |
| *Goniistius zonatus* | | 155 | 5 | 20 | 10 | 15 | 15 | |
| *Acanthopagrus Schlegelii.* | 37 | 600 | 2 | 5 | [1]3 | [1]2 | 10–20 | Lightly anesthetized; calming effect. |
| *Oplegnathus fasciatus.* | | 1,100 | 7 | 10 | 10 | 40 | 15 | |
| | 39 | 1,600 | 2 | 5 | | [1]7 | 15 | Lightly anesthetized; calming effect. |
| | 40 | 1,800 | 2 | 10 | | [1]3 | 10 | Lightly anesthetized; calming effect. |
| | 38 | 1,500 | 2 | 25 | 15 | 45 | 15 | |
| *Paralichthys olivaceus.* | | 600 | 1 | 20 | 5 | 10 | 8 | |
| | | 700 | 4 | 10 | 10 | 40 | 15 | |
| | 36 | 810 | 1 | 2 | [1]5 | [1]3 | 2–5 | Lightly anesthetized; calming effect. |
| | 37 | 850 | 1 | 10 | 5 | 25 | 10 | |
| *Longirastrum* | 34 | 410 | 2 | 5 | | [1]4 | 2–5 | Lightly anesthetized; calming effect. |
| | 37 | 560 | 2 | 25 | 30 | [1]1 | 15–20 | |
| *Seriola purpurascens.* | 53 | 1,670 | 1 | 25 | 30 | 1 | 5 | |
| | 53 | 1,670 | 1 | 5 | | [1]3 | 2 | Lightly anesthetized; calming effect. |

[1] Hours.

It was then observed that all the treated fishes showed the stage of excitation neither in the anesthetizing bath nor in the recovering bath, and that all the treated fishes had tumbled down in the anesthetizing bath except the ones which were lightly anesthetized as referred to in the column "Remarks" of Table 10.

EXAMPLE 14

Ear-shells (*Nordotis gigantea*) were placed in 2 l. of aerated marine water in a glass pot and allowed to stick to the vertical glass wall of the pot. Thereafter a methanolic solution of 10% of 2 - amino - 4 - phenyl- thiazole or 2 - methyl - 4 - phenyl - thiazole as the test compound was added dropwise under agitation to the marine water bath to give the concentration of the active compound as specified in Table 11 below. When the ear-shells fell down from the vertical glass wall, they were estimated to have been anesthetized. The time between the administration of the test compound and the fall-down of the shells was recorded as "Required anesthetizing time." The ear-shells which fell down were immediately removed from the anesthetizing bath and then transferred into a recovering bath of aerated fresh marine water which was placed in a similar glass pot, with the top side of the shells situated downward on the bottom of the pot. The shells turned up in the recovering bath and again sticked to the vertical wall of the pot. The time elapsed between the transfer into the recovering bath and the second sticking to the pot wall was recorded as "Required recovering time." During the tests, the water temperature was kept at 20.5°C. For each test, 10 to 20 shells were used. The results of test obtained are shown in Table 11 below, on average.

TABLE 11

| Test compound | Concentration of test compound (p.p.m.) | Shell length (mm.) | Required anesthetizing time (minute) | Required recovering time (minute) |
| --- | --- | --- | --- | --- |
| 2-amino-4-phenyl thiazole | 500 | 50–50 | <1 | 0 |
| | 100 | 9 | <6 | <1 |
| | 100 | 25 | <11 | <1 |
| | 100 | 40 | <11–12 | <1 |
| | 50 | 4.5 | <9 | <1 |
| | 50 | 8.3 | <15 | <1 |
| | 50 | 46 | <20 | <1 |
| | 50 | 40 | <25 | <1 |
| 2-methyl-4-phenyl-thiazole | 500 | 41 | <1 | 0 |
| | 100 | 10 | <6 | 0 |
| | 100 | 45–50 | <8–11 | 0 |
| | 50 | 6–10 | <21 | 0 |
| | 50 | 38–40 | <21 | 0 |
| | 50 | 41–45 | <27 | 0 |

From the test results as mentioned above, it may be seen that 2-amino-4-phenyl-thiazole and 2-methyl-4-phenyl - thiazole are useful to make ear-shells fall down from rocks to which the shells strongly have sticked in phenyl-thiazole are useful to make ear-shells fell down the sea, whereby removal and collection of cultured ear-shells from the rocks may be facilitated and a fear of damaging the shell body on removal thereof may be minimized. Accordingly the transport of cultured ear-shells from one cultivating farm to another one may be facilitated. When the cultured ear-shells which are treated with the anesthetic compound according to the present invention were cultured further in a normal way for the subsequent period of 1 to 3 months, it was not found that any disorder appeared in the cultured shells.

EXAMPLE 15

In a box of hard polyethylene containing 150 l. of solution of 4 micro-grams/ml. of 2-amino-4-phenylthiazole hydrobromide in marine water at 22° C. were placed 20 sea-breams (*Oplegnathus fasciatus*) of 10 cm. in body length. When the fishes had been anesthetized to the calming state, the box containing the anesthetized fishes was transported by means of a car driving over a distance of 200 km., while blowing air into the anesthetizing bath. During the transport, the water temperature in the bath was raised to 24° C. Thereafter, the fishes were removed from the anesthetizing bath and then transferred into a recovering bath consisting of 0.5 ton of artificial sea water at 24° C. Required recovering time was about 1 minute. The fishes were subsequently kept in a normal way for 6 months under aeration. Any disorder could not be observed.

What we claim is:

1. A method of temporarily anesthetizing living aquatic animals, which comprises placing the aquatic animals selected from the group consisting of fishes, crawfishes, lobsters, crabs and shells, in an anesthetizing bath consisting of water containing an effective concentration of at least one thiazole derivative of the formula

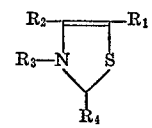

wherein $R_1$ is a hydrogen, methyl, ethyl, phenylmercapto or p-chlorophenylmercapto group; $R_2$ is methyl, ethyl, phenyl, p-methylphenyl, p-methoxyphenyl, p-chlorophenyl or p-bromophenyl group; or $R_1$ and $R_2$ taken together with the adjacent two carbon atoms of the thiazole nucleus form a tetrahydrobenzene ring, dihydronaphthalene ring or 4H-benzothiopyran ring fused to the thiazole nucleus when $R_4$ represents an amino group —$NH_2$; either $R_3$ is absent, or $R_3$ is a methyl group when $R_4$ represents a methylimino group =NCH provided that the double bond adjacent to the nitrogen atom of the thiazole nucleus is then a single bond; and $R_4$ is a methyl, amino, hydrazino or methylimino group, or an acid-addition salt thereof, as the anesthetic compound, for a sufficient time to anesthetize the animals.

2. The method of claim 1 wherein the anesthetic compound is of the formula

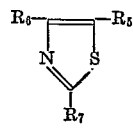

in which $R_5$ is a hydrogen, methyl or ethyl group; $R_6$ is a phenyl or methyl group; and $R_7$ is a methyl group or an amino group —$NH_2$, or an acid-addition salt thereof.

3. The method of claim 1 wherein the anesthetic compound is of the formula

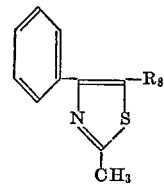

in which $R_8$ is a hydrogen or methyl group, or an acid-addition salt thereof.

4. The method of claim 1 wherein the anesthetic compound is of the formula

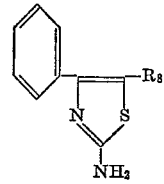

in which $R_8$ is a hydrogen or methyl group, or an acid-addition salt thereof.

5. The method of claim 1 wherein the anesthetic compound is of the formula

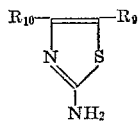

in which $R_9$ is a hydrogen or ethyl group; $R_{10}$ is a phenyl or p-methoxyphenyl group; or $R_9$ and $R_{10}$ taken together with the adjacent two carbon atoms of the thiazole nucleus form a tetrahydrobenzene ring, dihydronaphthalene ring or 4H-benzothiopyran ring fused to the thiazole nucleus, or an acid-addition salt thereof.

6. The method of claim 1 wherein the anesthetic compound is of the formula

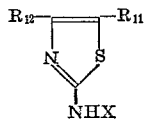

in which $R_{11}$ is a hydrogen, methyl or phenylmercapto group; $R_{12}$ is an ethyl, phenyl, p-methylphenyl or p-chlorophenyl group; and X is a hydrogen or an amino group —$NH_2$, or an acid-addition salt thereof.

7. The method of claim 1 wherein the anesthetic compound is of the formula

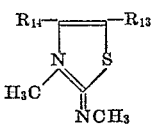

in which $R_{13}$ is a hydrogen or p-chlorophenylmercapto group; and $R_{14}$ is a phenyl or p-bromophenyl group, or an acid-addition salt thereof.

8. The method of claim 1 wherein the anesthetic compound is in the form of its hydrobromide, hydrochloride, hemi-sulfate, hemi-malate, hemi-succinate or methanesulfonate salt.

9. The method of claim 1 wherein the anesthetic compound is 2-methyl-4-phenyl-thiazole or its hydrobromide salts.

10. The method of claim 1 wherein the anesthetic compound is 2-amino-4-phenyl-thiazole or its hydrobromide salts.

11. The method of claim 1 wherein the anesthetic compound is 2-methyl-4-phenyl-5-ethyl-thiazole.

12. The method of claim 1 wherein the anesthetic compound is 2-hydrazino-4-phenyl-thiazole.

13. The method of claim 1 wherein the anesthetic compound is 2,4-dimethyl-thiazole or its hydrobromide salts.

14. The method of claim 1 wherein the anesthetic compound is 2-amino-4-phenyl-5-phenylmercapto-thiazole.

15. The method of claim 1 wherein the anesthetic compound is present at a concentration of 1 to 100 p.p.m. by weight of the water.

16. The method of claim 1 in which air or oxygen is blown into the anesthetizing bath while the aquatic animals are present therein.

References Cited

UNITED STATES PATENTS

| | | | |
|---|---|---|---|
| 1,961,840 | 6/1934 | Bolton | 260—305 X |
| 2,133,969 | 10/1938 | Bochman | 260—302 |
| 1,743,083 | 1/1930 | Johnson | 260—302 X |

OTHER REFERENCES

Chemical Abstracts 65:17781b (1966).

ALBERT T. MEYERS, Primary Examiner
L. SCHENKMAN, Assistant Examiner